United States Patent [19]

Witt

[11] Patent Number: 4,953,533

[45] Date of Patent: Sep. 4, 1990

[54] SELF-IGNITING COMBUSTION PACKAGE

[76] Inventor: Gary L. Witt, 52499 Mound, Utica, Mich. 48087

[21] Appl. No.: 475,443

[22] Filed: Feb. 6, 1990

[51] Int. Cl.5 .......................... A47J 37/00; F24B 3/00
[52] U.S. Cl. ................................ 126/25 B; 126/9 A; 44/520
[58] Field of Search ............ 126/9 R, 9 A, 9 B, 25 R, 126/25 B, 263, 279, 306, 290; 110/239, 241; 44/519, 520, 521, 522

[56] References Cited

U.S. PATENT DOCUMENTS

| | | | |
|---|---|---|---|
| 2,834,661 | 5/1958 | Chaplin | 126/9 A |
| 2,955,029 | 10/1960 | Foote | 44/522 |
| 3,279,453 | 10/1966 | Norehad et al. | 126/9 A |
| 3,307,506 | 3/1967 | Rose | 126/25 B |
| 3,377,147 | 4/1968 | Remines | 44/519 |
| 3,682,154 | 8/1972 | Mollere | 126/9 A |
| 3,739,732 | 6/1973 | Graham | 126/25 B |
| 4,311,130 | 1/1982 | Noose | 126/25 B |
| 4,782,812 | 11/1988 | Kellerman | 126/25 R |

Primary Examiner—James C. Yeung
Attorney, Agent, or Firm—Remy J. VanOphem

[57] ABSTRACT

A combustible package for purposes of outdoor cooking and barbecuing is disclosed. The combustible package consists of an octagonally-shaped platform, a centrally located chimney, a wall attached along the platform's perimeter, a plurality of legs, and an igniter. The platform has a central aperture which is contiguous with the chimney, a plurality of secondary apertures uniformly located between the central aperture and the platform's perimeter, and a plurality of peripheral apertures. The wall is composed of an inner and outer wall portion which form a peripheral air space around the platform's entire perimeter. The peripheral air space is in communication with the peripheral apertures. When placed below the platform and ignited, the igniter produces hot combustion gases which flow through the central aperture and chimney, the secondary apertures, and the peripheral apertures and air space, thereby uniformly and rapidly heating the charcoal for more uniform burning.

16 Claims, 2 Drawing Sheets

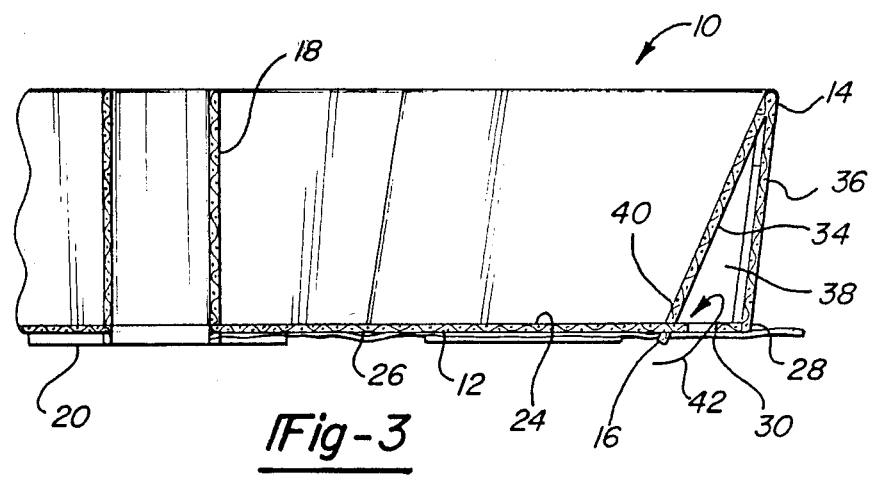
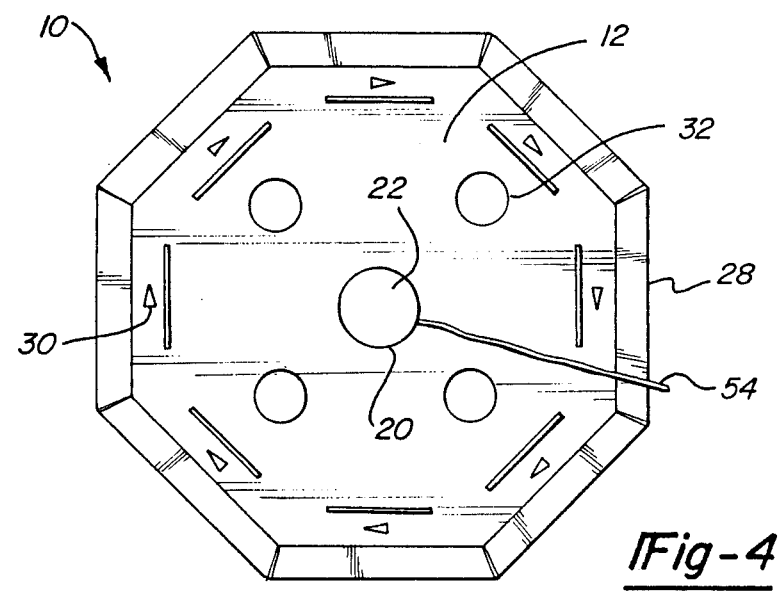
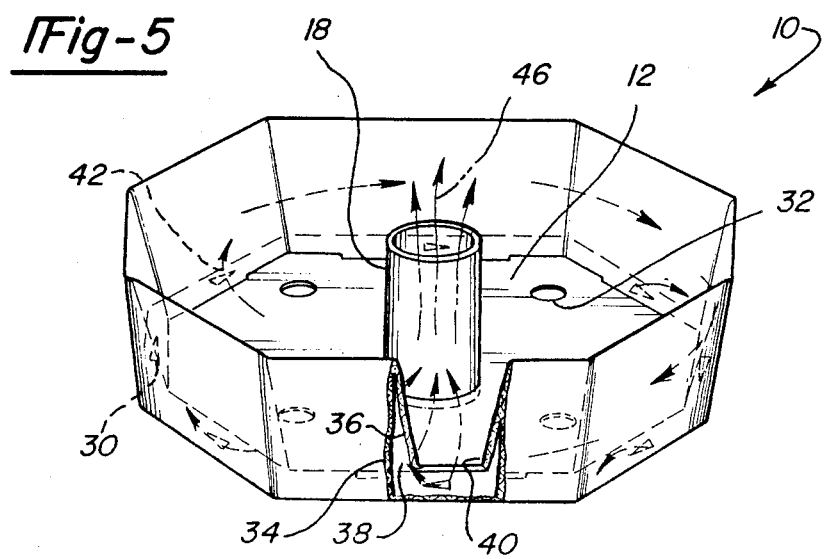

SELF-IGNITING COMBUSTION PACKAGE

BACKGROUND OF THE INVENTION

1. Field of the Invention

The present invention generally relates to a combustible package containing a combustible material, such as charcoal, which is used for outdoor cooking and barbecuing. More specifically, this invention relates to a self-igniting combustible package whose features promote safety and convenience while minimizing the time necessary to produce a uniform cooking fire.

2. Description of the Prior Art

The use of charcoal and other suitable combustible materials for outdoor cooking and barbecuing is a popular alternative to the use of propane gas. Further, the use of combustible packages to receive and promote combustion of the charcoal are well known in the art and are employed where convenience and safety are desired. Such combustible packages provide convenience in that they minimize the handling required to properly position the charcoal for uniform burning. Safety is enhanced by eliminating the need for a flammable igniter, such as petroleum-based flame accelerators commonly found commercially.

As an example, U.S. Pat. No. 3,377,147 to Remines teaches a disk-shaped combustible platform upon which the charcoal is placed, the platform having channels and ribs extending radially from a central aperture. This arrangement is lit from the disk's perimeter thereby forming a combustion ring that burns inwardly toward the central aperture. The channels and ribs provide for air flow from the periphery to the central aperture. However, the heating of the charcaol is limited to the heat generated by the platform underneath the charcoal.

Others in the prior art have attempted in various ways to promote the uniform heating of the charcoal through orienting the charcoal in a vertical stack within the combustible package. Both U.S. Pat. No. 2,834,661 to Chaplin and U.S. Pat. No. 2,955,029 to Foote teach a combustible package having a central flue. The combustible package is constructed to be vertically upstanding, thereby orienting the charcoal to be vertically stacked around the central flue. As the combustible package is consumed, combustion gases flow up through the central flue, providing for the heating of the charcoal from the center. The central flue also promotes the self-feeding of the charcoal into the center as the central flue is consumed by the fire. However, the central flue concentrates the heat of the fire within the center of the charcoal stack only, thus neglecting the outer edges of the charcoal.

U.S. Pat. No. 4,460,377 to Kalil approaches the problem by extending the flue across the width of the combustible package, thereby increasing the quantity of charcoal effected by the centrally concentrated heat. Kalil further provides a second compartment beneath the stack of charcoal for containing an igniter means for igniting the fire. Again, this configuration's utilization of the combustion gases neglects the outer perimeter of the charcoal.

An alternative approach taught by U.S. Pat. No. 4,503,835 to Williams involves the use of a metal sleeve in which a combustible container containing a quantity of charcoal is inserted. The metal sleeve is provided with openings to allow updrafts around the combustible container, thereby allowing the heating of the charcoal from the combustible container's exterior. However, this approach does not allow for uniform heating of the charcoal nor does it provide for an integral igniter or single package that is entirely combustible.

As can be appreciated from the above, the prior art has not succeeded in providing a self-igniting combustible package which utilizes the full potential of the heat generated by the incipient flame for purposes of preheating a quantity of charcoal.

Therefore, what is needed is a simple, one-piece, combustible package having a built-in igniter and which provides for the uniform heating of a quantity of charcoal by concentrating the combustion heat not only beneath and at the center of the quantity of charcoal, but also along the perimeter of the charcoal.

SUMMARY OF THE INVENTION

It is an object of the present invention to provide a simple, one-piece combustible package for facilitating the combustion of a quantity of charcoal or similar combustible material for the general purposes of outdoor cooking.

It is a further object of this invention that such combustible package utilize the heat generated by combustion to uniformly heat the quantity of charcoal to be burned thereby encouraging combustion and minimizing time required to ready the charcoal for cooking.

It is yet a further object of this invention that such combustible package have a self-contained igniter means, thus eliminating any need for petroleum-based flame accelerators.

In accordance with a preferred embodiment of this invention, these and other objects and advantages are accomplished as follows.

According to the present invention there is provided a combustible package made from any suitable material that is readily combustible. The combustible package includes a substantially horizontal platform whose perimeter is generally of any convenient geometrical shape. The platform has an upper and lower surface, an aperture located near its center, and a plurality of secondary apertures located between the central aperture and the perimeter. The platform also has peripheral apertures located generally equidistant from each other and adjacent to the platform's perimeter. The size and number of peripheral and secondary apertures are generally dependent upon the size of the platform, but can be readily ascertained with minimal experimentation.

In addition, the platform has legs extending downwardly from its lower surface to support the platform off its lower surface. A wall circumscribes the platform and is attached to the platform at its perimeter. The wall consists of an inner wall portion and an outer wall portion which together form a peripheral air space between them. The peripheral apertures are in communication with the air space provided by the wall. A chimney is located over the central aperture in the platform, forming a central passage which extends from beneath the platform to the top side of the platform. Lastly, an apparatus for igniting the combustible package is provided which is placed beneath the platform for purposes of igniting.

Ignition of the igniter produces hot combustion gases which flow along the lower surface of the platform. The combustion gases flow upwardly through the secondary apertures, inwardly and upwardly through the central aperture and the chimney, and also outwardly and upwardly through the platform's peripheral apertures and into the peripheral air space. Once within the peripheral air space, the combustion gases circulate through the wall to more evenly distribute the heat along the combustion package's entire perimeter.

According to a preferred aspect of this invention, an inventive feature of the combustion package is that, as a result of the unique flow path of the hot combustion gases, the gases act to heat an enclosed quantity of charcoal along the entire platform surface, up through the center of the charcoal pile, and also around the perimeter of the charcoal pile. As the platform is consumed, the wall and chimney continue to concentrate the combustion heat to uniformly ignite the charcoal inwardly from its perimeter and outwardly from its center, respectively.

In addition, a significant advantage of the present invention is that the combustible package can be readily sold as a complete package, including a predetermined quantity of charcoal. The combustible package and its contents are, therefore, entirely consumed during the cooking session.

Other objects and advantages of this invention will be better appreciated after a detailed description thereof which follows.

BRIEF DESCRIPTION OF THE DRAWINGS

FIG. 3 is a partial cross-section view of the self-igniting combustible package shown in FIG. 2;

FIG. 4 is a bottom view of the self-igniting combustible package shown in FIG. 1 in accordance with a preferred embodiment of this invention;

FIG. 5 is a partial cut-away view of the self-igniting combustible package shown in FIG. 1 in accordance with a preferred embodiment of this invention.

DETAILED DESCRIPTION OF THE PREFERRED EMBODIMENT

Figure 1:
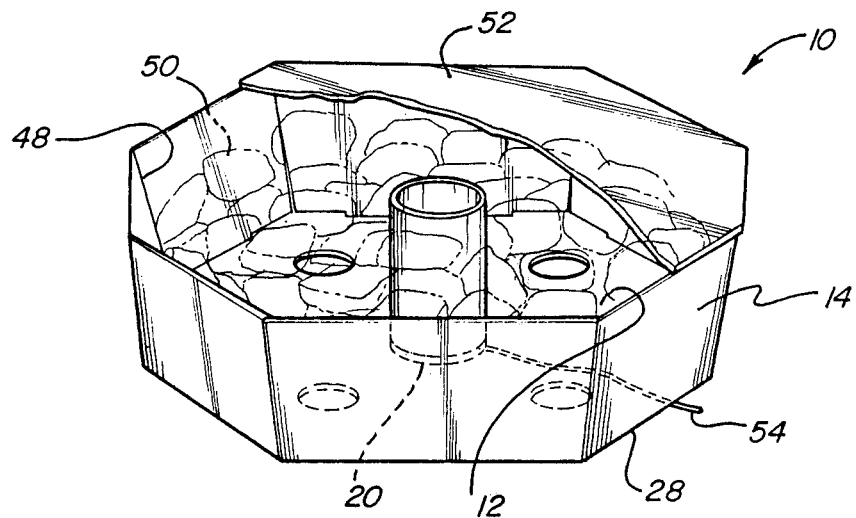
FIG. 1 shows a self-igniting combustible package containing a predetermined quantity of charcoal and a portion of the package lid which has been cut-away for clarity, in accordance with a preferred embodiment of this invention.

In a preferred embodiment of this invention, a combustible package 10 as shown in FIG. 1 is provided which is formed from any suitable combustible material. For best results, corrugated cardboard coated with wax on at least one side is used as the combustible material. Corrugated cardboard is preferred for its ability to retain heat, its ability to burn readily, and its availability. The combustible package 10 includes a platform 12 whose perimeter 28 can be of any convenient geometrical shape. However, in a preferred embodiment an octagonal shape provides better overall burn characteristics and will, therefore, be used for illustrative purposes.

As can be better seen in the bottom view of FIG. 4, a central aperture 22 is centrally located through the platform 12. A plurality of secondary apertures 32 is provided between the central aperture 22 and the perimeter 28. Additionally, a plurality of peripheral apertures 30 is provided adjacent to the perimeter 28, the peripheral apertures 30 being generally equidistant from each other. The size and number of peripheral apertures 30 and secondary apertures 32 are generally dependent upon the size of the platform 12, but can be readily ascertained with minimal experimentation. As an example, it has been found that an octagonal platform 12 with a diameter of roughly twelve inches performs satisfactorily with a central aperture 22 having a diameter of approximately one and one half inches, four equally spaced secondary apertures 32 of approximately one inch diameter, and eight equally spaced peripheral apertures 30 approximately triangular in shape, or any other convenient shape, with a base of approximately one quarter inch and a length of approximately one half inch.

Referring to FIG. 3, the combustible package 10 further consists of a wall 14, eight legs 16, a chimney 18, and an igniter 20. The platform 12 is substantially horizontal with an upper surface 24, a lower surface 26, and the perimeter 28. The legs 16 extend downwardly from the platform 12 to support the platform 12 off its lower surface 26. The wall 14 circumscribes the platform 12 adjacent to the platform's perimeter 28. The wall 14 is formed by two wall portions, an inner wall poriton 34 and an outer wall portion 36. The inner wall portion 34 and outer wall portion 36 form a peripheral air space 38 between themselves. The peripheral air space 38 is in communication with the peripheral apertures 30. Additionally, the inner wall portion 34 is provided with inner wall openings 40 formed between the inner wall portion 34 and the platform's upper surface 24 to provide an outer flow passage 42 between the platform's lower surface 26 and the platform's upper surface 24.

Figure 2:
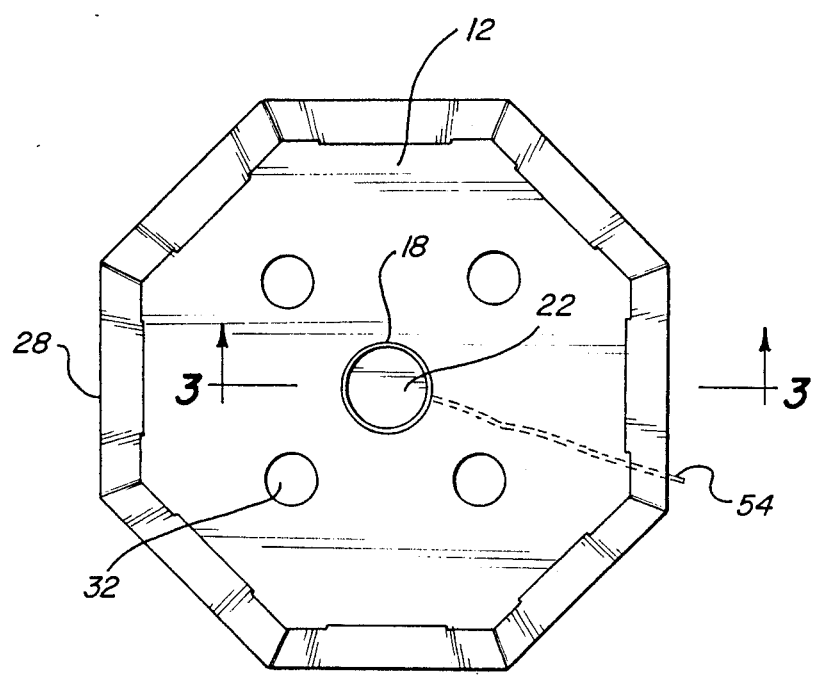
FIG. 2 is a top view of the self-igniting combustible package shown in FIG. 1 in accordance with a preferred embodiment of this invention.

As seen in FIG. 2, the chimney 18 is located over the central aperture 22 of the platform 12. The cross-section of the chimney 18 can be of any convenient shape, such as the circular form shown. The chimney 18 extends upwardly from the platform's upper surface 24, thereby forming an inner flow passage 46 with the central aperture 22.

As seen in FIG. 1, the platform 12 and the wall 14 form a compartment 48 in which a predetermined quantity of charcoal 50 can be contained. For purposes of shipping and storage, the igniter 20 is contained within the compartment 48, which is enclosed by a removable lid 52 to protect the contents. In practice, the igniter 20 may also serve as the removable lid for purposes of convenience. To light the combustible package 10, the igniter 20 is placed beneath the platform's lower surface 26. The igniter 20 can then be lit through any conventional means, such as a fuse 54.

As shown in FIG. 5, as the igniter 20 burns it produces hot combustion gases which flow upwardly through the secondary apertures 32 in the platform 12. Similarly, hot combustion gases flow inwardly and upwardly through the inner flow passage 46 formed by the central aperture 22 and the chimney 18, and also outwardly and upwardly through the outer flow passage 42 formed by the plurality of peripheral apertures 30, the peripheral air space 38, and the inner wall openings 40. The majority of the combustion gases which enter the outer flow passage 42 remain within and circulate through the peripheral air space 38 between the inner and outer wall portions, 34 and 36, respectively. As a result, the compartment 48 containing the predetermined quantity of charcoal 50 is uniformly heated by the hot combustion gases passing through the platform's secondary apertures 32 and the inner wall openings 40, and further by the rapid warming of the platform 12, the chimney 18 and the wall 14. Rapid and uniform heating of the predetermined quantity of charcoal 50 is thereby achieved, and consequently a charcoal fire is made ready for cooking in a minimal amount of time.

It is apparent that the benefit derived from the ability of the combustion package 10 to uniformly heat the predetermined quantity of charcoal 50 is dependent upon the uniformity of the hot combustion gas supply reaching the wall 14. Perimeter shapes which provide a more uniform distance between the platform perimeter 28 and the center of the platform 12, therefore, provide for better burn characteristics. An example of the preferred form is the disclosed octagonal shape, however, a circular shape or most polygonal shapes would also be suitable.

Figure 6:
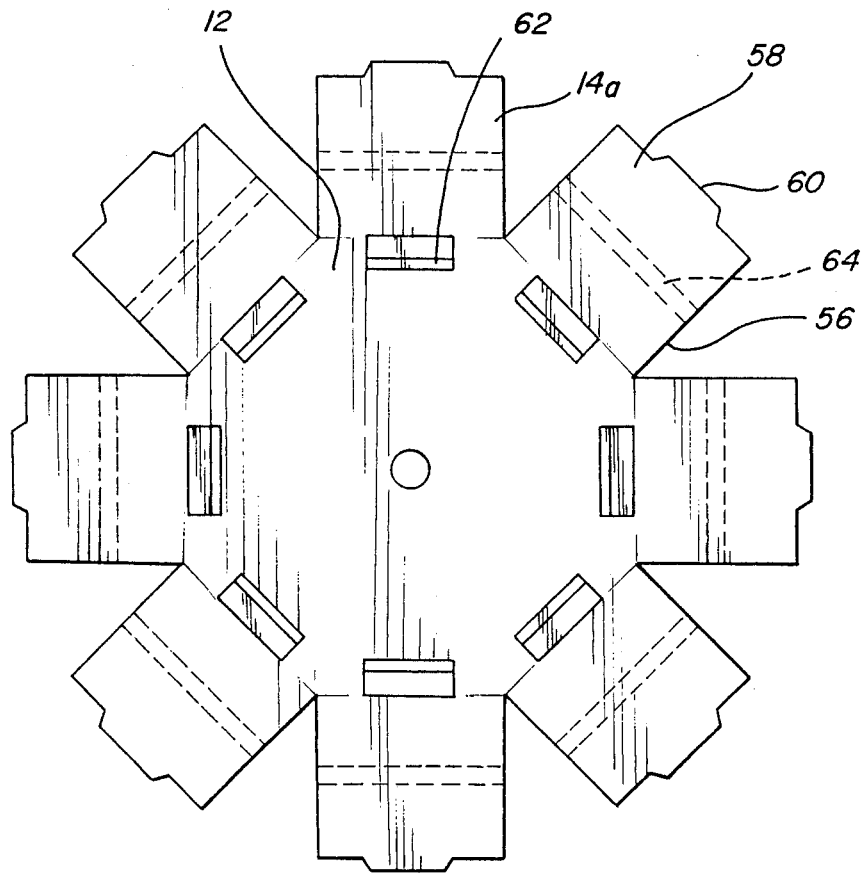
FIG. 6 is a view of the self-igniting combustible package shown in FIG. 1 as it appears die-cut from a flat sheet of combustible material in accordance with a preferred embodiment of this invention.

In the preferred embodiment, a significant advantage of providing a polygonal shape to the combustible package 10 is the ability to form the combustible package from a single sheet of cardboard or other combustible material. As a result there is no requirement to produce a combustible package 10 whose manufacture or assembly is complicated. As can be seen in FIG. 6, the platform 12, wall 14, and the various apertures can be readily formed through a die-cut operation with a single sheet of corrugated cardboard.

Referring to FIG. 6, the form 56 resulting from the die-cut operation is generally octagonal with eight radials 58 extending therefrom. Extending from each radial 58 is a tab 60. Eight slots 62 are formed adjacent and interior to the peripheral apertures 30 and correspond to each of the eight tabs 60. Following the die-cut operation, individual wall segments 14a of the wall 14 can be formed by first folding the radials 58 along the phantom lines 64. The tabs 60 can then each be inserted into a corresponding slot 62 to form the inner wall portion 34, the outer wall portion 36, and the peripheral air space 38. Each tab 60 also forms a leg 16 as it protrudes through the platform 12. It is important to note that the inner wall openings 40 can be readily provided through the gaps which are inherently formed where the individual wall segments 14a meet each other and where they abut the platform's upper surface 24.

While the invention has been described in terms of a preferred embodiment, it is apparent that other forms could be adopted by one skilled in the art. Examples are providing various geometric forms other than those described here, and other variations for providing a flow passage around the perimeter of the combustible package. Accordingly, the scope of the invention is to be limited only by the following claims.

What is claimed is:
1. A combustible package comprising:
   a substantially horizontal platform, said platform comprising an upper surface and a lower surface, a perimeter, a central aperture, and a plurality of peripheral apertures adjacent to said perimeter;
   circulation means circumscribing said platform adjacent said perimeter, said circulation means being in communication with said plurality of peripheral apertures;
   a chimney positioned substantially coaxial to said central aperture of said platform, said chimney extending upwardly from said upper surface of said platform, said chimney forming a flue contiguous said central aperture; and
   igniter means located beneath said platform; whereby ignition of said igniter means produces combustion gases beneath said lower surface of said platform, said combustion gases flowing inwardly and upwardly through said central aperture and said chimney, and said combustion gases also flowing outwardly and upwardly through said peripheral apertures, thereby entering said circulation means.

2. A combustible package as recited in claim 1, wherein said circulation means comprises a wall, said wall having an inner wall portion and an outer wall portion, said inner and outer wall portions forming a peripheral air space therebetween, said peripheral air space being in communication with said plurality of peripheral apertures.

3. A combustible package as recited in claim 2, wherein said platform further comprises a plurality of secondary apertures which are uniformly disposed between said central aperture and said perimeter, whereby said combustion gases also flow upwardly through said plurality of secondary apertures.

4. A combustible package as recited in claim 2, further comprising a plurality of legs extending downwardly from said lower surface of said platform.

5. A combustible package as recited in claim 2, wherein said platform, said inner and outer wall portions, and said chimney are formed from corrugated cardboard which is coated with wax on at least one side.

6. A combustible package as recited in claim 2, wherein said platform and said wall are die cut from a flat sheet of corrugated cardboard to provide a single, one-piece construction.

7. A combustible package as recited in claim 2, wherein said inner wall portion further comprises inner wall openings.

8. A combustible package as recited in claim 2, wherein said perimeter is generally octagonal in form.

9. A combustible package as recited in claim 2, further comprising a compartment formed by said platform and said wall, said compartment containing a predetermined quantity of charcoal therein.

10. A combustible package as recited in claim 9, wherein said igniter means is contained within said compartment for purposes of shipping, said igniter means being removed from said compartment and placed beneath said platform for purposes of igniting said igniter means.

11. A combustible package as recited in claim 10, further comprising a removable lid, said removable lid enclosing said compartment for purposes of shipping.

12. A combustible package as recited in claim 11, wherein said igniter means is attached to said removable lid, said removable lid and igniter means being removed from said compartment and placed beneath said platform for purposes of igniting said igniter means.

13. A combustible package for use in outdoor cooking and barbecuing, said combustible package comprising:
   a substantially horizontal platform, said platform comprising an upper surface and a lower surface, a perimeter, a central aperture, a plurality of secondary apertures which are uniformly disposed between said central aperture and said perimeter, and a plurality of peripheral apertures adjacent to said perimeter;
   a plurality of legs extending downwardly from said lower surface;

a wall circumscribing said platform adjacent said perimeter, said wall having an inner wall portion and an outer wall portion, said inner and outer wall portions forming a peripheral air space therebetween, said peripheral air space being in communication with said plurality of peripheral apertures, said inner wall portion having inner wall openings therethrough;

a chimney positioned substantially coaxial to said central aperture of said platform, said chimney extending upwardly from said upper surface of said platform, said chimney forming a flue contiguous with said central aperture;

a compartment formed by said platform and said wall, said compartment containing a predetermined quantity of charcoal therein;

a lid removably mounted to said combustible package for enclosing said compartment formed by said platform and said wall; and igniter means placed within said compartment;

whereby said igniter means is removed from said compartment and placed beneath said platform for purposes of ignition, said igniter means producing hot combustion gases upon ignition, said hot combustion gases flowing upwardly through said plurality of secondary apertures, said hot combustion gases flowing inwardly and upwardly through said central apertures and said chimney, and said hot combustion gases also flowing outwardly and upwardly through said plurality of peripheral apertures, thereby entering and circulating through said peripheral air space between said inner and outer wall portions, a portion of said hot combustion gases escaping through said inner wall openings and into said compartment containing said predetermined quantity of charcoal.

14. A combustible package as recited in claim 13, wherein said igniter means is attached to said removable lid, whereby said removable lid and igniter means is removed to expose said predetermined quantity of charcoal and is subsequently placed beneath said platform.

15. A combustible package as recited in claim 13, wherein said platform, said inner and outer wall portions, said plurality of legs, and said chimney are formed from corrugated cardboard which is coated with wax on at least one side.

16. A combustible package as recited in claim 13, wherein said perimeter is generally octagonal in form.

* * * * *